United States Patent [19]

Veith

[11] Patent Number: 5,121,241

[45] Date of Patent: Jun. 9, 1992

[54] TRANSCEIVER FOR A BIDIRECTIONAL COHERENT OPTICAL TRANSMISSION SYSTEM

[75] Inventor: Gustav Veith, Hemmingen, Fed. Rep. of Germany

[73] Assignee: Alcatel N.V., Amsterdam, Netherlands

[21] Appl. No.: 392,087

[22] Filed: Aug. 10, 1989

[30] Foreign Application Priority Data

Aug. 11, 1988 [DE] Fed. Rep. of Germany ....... 3827228

[51] Int. Cl.$^5$ .............................................. H04B 10/06
[52] U.S. Cl. ................... 359/152; 359/113; 359/191
[58] Field of Search ............... 455/606, 607, 617, 618; 359/113, 152, 191

[56] References Cited

U.S. PATENT DOCUMENTS

| 470,474 | 11/1987 | Shikada | 455/606 |
| 4,882,771 | 11/1989 | Rocks | 455/606 |
| 4,977,620 | 12/1990 | Smith et al. | 455/619 |

FOREIGN PATENT DOCUMENTS

| 0168192 | 1/1986 | European Pat. Off. |
| 2538349 | 3/1976 | Fed. Rep. of Germany . |

OTHER PUBLICATIONS

Atkins et al., "Application of Brillouin amplification in coherent optical transmission", *Elcetronics Letters*, vol. 22, No. 2, May 8, 1986, pp. 556-558.

"Electro-optic frequency translators and their applications in coherent optical fibre systems", BR Telecom Technol, vol. No. 4, Oct. 1986, W. A. Stallard et al.

"Opticher Uberlagerungsempfang:Die Technik der ubernachsten Generation glasfasergebunener Optischer Nachrichtensysteme", Der Fernmelde Ing. Feb. 85, N2.

*Primary Examiner*—Reinhard J. Eisenzopf
*Assistant Examiner*—Leslie Pascal

[57] ABSTRACT

A transceiver (11) for a bidirectional coherent optical transmission system with a fiber link (12) is provided with a laser (16) for transmitting a signal carrier wave, a modulator, a heterodyne or homodyne coherent detector (13), and a demodulator. To make such a transceiver (11) more economical on components, more compact in design, and less expensive to manufacture, the laser (16) is simultaneously used to transmit oscillator radiation for the heterodyne or homodyne coherent detector (13) of the same transceiver (11) and/or to optically amplify the signal carrier wave arriving from the remote transceiver (11) over the fiber link (12).

15 Claims, 2 Drawing Sheets

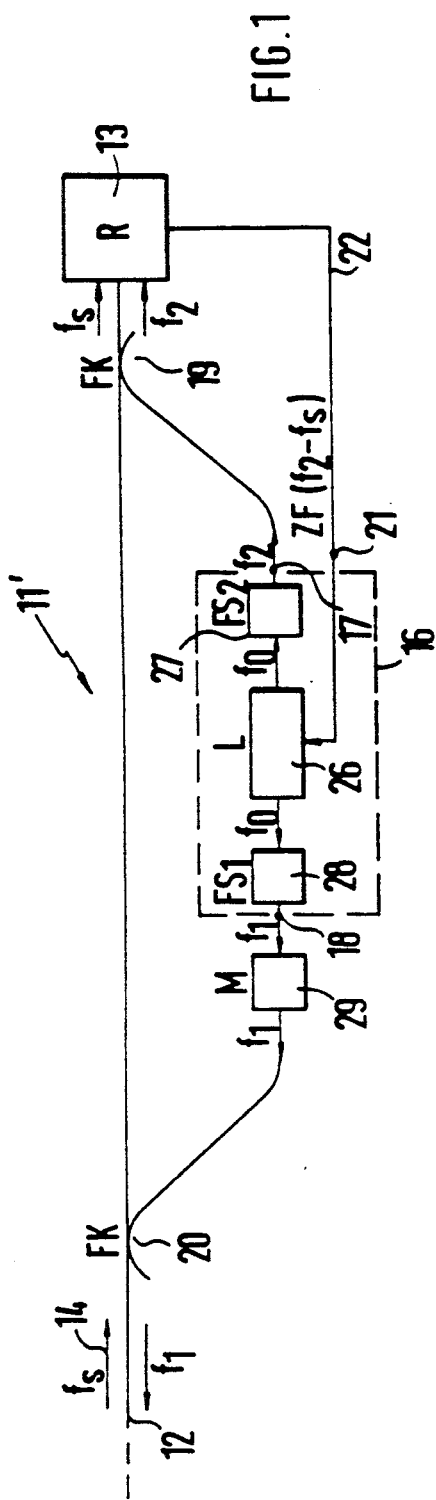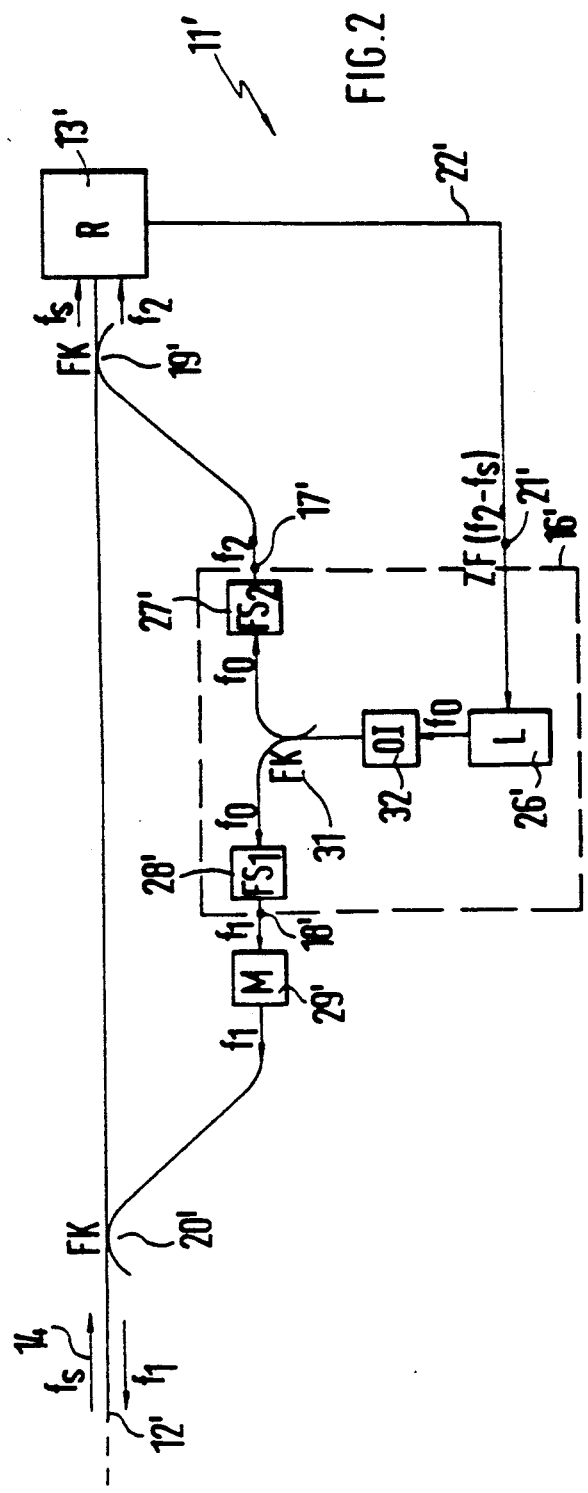

TRANSCEIVER FOR A BIDIRECTIONAL COHERENT OPTICAL TRANSMISSION SYSTEM

TECHNICAL FIELD

The present invention relates to a transceiver for a bidirectional coherent optical transmission system with a fiber link.

CLAIM FOR PRIORITY

This application is based on and claims priority from an application first filed in Fed. Rep. Germany on Aug. 11, 1988 under Ser. No. 38 27 228.8. To the extent such prior application may contain any additional information that might be of any assistance in the use and understanding of the invention claimed herein, it is hereby incorporated by reference.

BACKGROUND ART

In optical communication engineering, coherent optical heterodyne and homodyne detection techniques are currently the subject of intensive research and development because of the extremely high transmission capacity of such systems, cf. for example, M. Rocks, "Optischer Überlagungsempfang: Die Technik der Übernächsten Generation glasfasergebundener optischer Nachrichtensysteme", Der Fernmelde-Ingenieur, No. 2, 1985, pp. 1-38. The methods described there are commonly used in broadcasting systems employing optical carrier frequencies in the 200-THz range. As shown particularly in FIG. 3 of that article, in coherent optical heterodyne and homodyne detection systems, the optical signal carrying the useful information is combined with the output beam of a continuous-wave local-oscillator laser. In the heterodyne detection technique, this results in an electric intermediate-frequency signal from which the useful information can be recovered with high sensitivity by electrical demodulation. A similar arrangement is described in W.A. Stallard et al, "Electro-optic frequency translators and their applications in coherent optical fibre systems", Br.Telecom. Technol. J., Vol. 4, No. 4, Oct. 1986, pp. 16-22 (especially FIG. 4). In many broadband communication applications, e.g., at the subscriber level of a broadband ISDN, bidirectional optical transmission is desired. In a coherent optical transmission system, this would necessitate equipping each transceiver at the subscriber end with two stabilized, narrow-band single-mode lasers, namely with a narrow-band transmit laser capable of being modulated and a narrow-band, frequency-controlled localoscillator laser. In other words, if conventional techniques were applied to coherent optical transmission, a transmitter/receiver unit would require a transmitter oscillator laser and a local oscillator laser for heterodyne or homodyne detection. To be able to separately transmit and receive on each channel in a bidirectional coherent optical single- or multi-channel system, both lasers require narrow linewidths, which lie between 0.1 and 50 MHz depending on the detection technique used, complex frequency control loops, e.g., for intermediate frequency control during heterodyne detection, a recognition system for specific optical reference channels, and optical isolators before the output to prevent optical feedback. Both single-mode lasers must thus be narrow-band, frequency-stabilized, and tunable. The transmit laser must also be capable of being RF modulated and must have an external modulator which should operate at bit rates above 1 Gb/s.

Thus, a coherent optical transmitter/receiver unit containing two frequency-stabilized, narrow-band single-mode lasers with the associated control systems and components is very complex and costly.

DISCLOSURE OF INVENTION

It is, therefore, the object of the present invention to provide a transceiver for a bidirectional coherent optical transmission system of the above kind which requires fewer components, is of a more compact design, and can be fabricated at lower cost while having the same performance capability.

In accordance with a broad aspect of the invention, the transmit laser is also used as a local oscillation source by the transceiver's detector and/or to amplify the received optical signal.

In accordance with a first aspect of the invention it is possible to employ only a single, narrow-band, frequency stabilized laser which can be used for at least two purposes, namely simultaneously as a transmit laser and as a local oscillator laser. This results in compact and low-cost components or modules for such a transceiver for bidirectional coherent optical transmission systems, which is a special advantage in multichannel optical transmission systems in particular. Such transceivers can be used, for example, in the broadband ISDN subscriber area and for local networks.

In C.G. Atkins et al, "Application of Brillouin amplification in coherent optical transmission", Electron. Lett., Vol. 22, No. 10, May 1986, pp. 556-558, it is shown how the signal carrier wave travelling in a single mode fiber can be amplified by sending narrow-band pumping light at a defined frequency distance in the opposite direction. Since optical amplification of narrow-band optical carrier waves by nearly 50 dB can thus be achieved in typical 30-km-long single-mode fibers with a relatively low optical pump power of a few mW, this means that with the currently attainable fiber losses of 0.2 dB/km (at 1.55 $\mu$m wavelength), the transmission length is increased by more than 100 km.

Thus, in accordance with a second aspect of the invention, it is possible to achieve a more compact, simpler, and considerably less expensive design of a transceiver for such an application.

Since the transmit laser in the transceiver, besides performing its function of transmitting a signal carrier wave and/or its function of transmitting oscillator radiation for the heterodyne or homodyne coherent detector, can also be used to optically amplify the incoming signal carrier wave, i.e., as a pump laser for selective optical amplification of signal waves, it is possible, particularly in coherent optical multi-channel transmission systems, to eliminate One embodiment is even though the order of magnitude in which this complexity can be reduced cannot be quantified at the present time because comparable repeater components have not yet been implemented in coherent optical transmission systems, a simplification and cost reduction are obtained due to the mere fact that the need for a narrow-band, frequency stabilized laser is eliminated.

One embodiment is especially suitable for use as a transceiver in a bidirectional coherent optical single- or multi-channel transmission system.

Another embodiment is especially suitable for use as a high-sensitivity receiver module for coherent optical transmission systems. Because of the effective fiber-optic Brillouin amplification, complicated electronic post-amplification can be dispensed with, and a receiver sensitivity limited only by quantum noise can possibly be achieved.

BRIEF DESCRIPTION OF DRAWINGS

Further details of the invention will become apparent from the following description of embodiments of the invention taken in conjunction with the accompanying drawing, in which:

FIG. 1 is a schematic diagram of an embodiment of a transceiver according to the invention for a bidirectional coherent optical transmission system;

FIG. 2 is a schematic diagram of another embodiment of a transceiver according to the invention for a bidirectional coherent optical transmission system.

BEST MODE FOR CARRYING OUT THE INVENTION

Figure 3A:
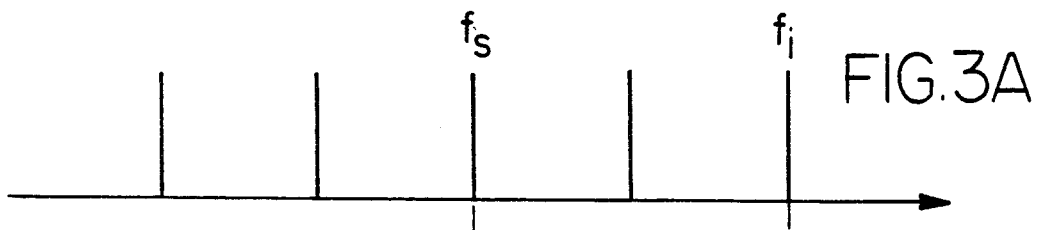
FIGS. 3a–c show schematically the locations of the frequencies of the coherent optical transmission channels (a), of the emission frequencies of a laser used in a transceiver module (b), and of the emission frequencies of a laser used in an amplifier/receiver module (c).

FIGS. 1 and 2 show two embodiments of a transceiver 11, 11' for a bidirectional coherent optical transmission system, i.e., a device or unit suitable for both transmitting and receiving information over a single-fiber link 12, 12'. They show only those elements of the transceiver 11, 11' which relate directly to the invention, i.e., neither the modulator nor the demodulator nor the electrooptical and optoelectrical transducer elements and other components of this kind commonly used in such a transceiver are shown.

The transceiver 11 of FIG. 1 has a heterodyne or homodyne coherent detector 13 which receives a signal carrier wave 14 of frequency $f_s$ over the fiber link 12. The carrier wave 14 has a message modulated thereon in a conventional manner and comes from a preferably identical transceiver (not shown). The carrier wave may be modulated by any of the conventional modulation techniques, such as amplitude modulation, frequency modulation, or phase modulation. The transceiver 11 further includes a module 16 having two outputs 17 and 18. One of the outputs, 17, is coupled into the fiber link 12 in the direction of the incoming signal carrier wave 14 through a first optical-waveguide or fiber coupler (FK) 19 before the carrier wave 14 enters the heterodyne or homodyne detector (R) 13, and the second output, 18, is coupled into the fiber link 12 in a direction opposite to that of the incoming carrier wave 14 through a second fiber coupler (FK) 20. An input 21 of the module 16 is connected to an output of the heterodyne or homodyne coherent detector 13 by a conductor 22.

The module 16 contains a narrow-band laser (L) 26 which emits radiation of fundamental frequency $f_O$ in two exit directions. The laser 26 is implemented with a bilaterally emitting laser diode, for example. One of the beams of fundamental frequency $f_O$ passes through a second frequency shifter (FS$_2$) 27 in which it is shifted to a frequency $f_2$ which is lower than the fundamental frequency $f_O$, for example. The other beam of fundamental frequency $f_O$ passes through a first frequency shifter (FS$_1$) 28, which shifts it to a frequency $f_1$ that is higher than the fundamental frequency $f_O$. This frequency shifted other beam is passed through an external modulator (M) 29 to the second fiber coupler 20. Each of the frequency shifters 27, 28 can be implemented with an integrated optical modulator. The conductor 22, which is connected to the output of the heterodyne or homodyne coherent detector 13, is coupled to the laser 26.

The transceiver 11' of FIG. 2 differs from the transceiver 11 of FIG. 1 by the construction of its module, 16'. Thus, the transceiver 11', too, has a heterodyne or homodyne coherent detector (R) 13', which receives a modulated signal carrier wave 14 of frequency $f_s$ over a fiber link 12', and two fiber couplers (FK) 19' and 20', which are arranged in the same manner as the fiber couplers 19 and 20 of FIG. 1 and are connected, respectively, to the first output 17' and the second output 18' of the module 16'. Like in FIG. 1, a conductor 22 connects the heterodyne or homodyne coherent detector 13' and the input of the module 16'.

The module 16' of FIG. 2, too, has a narrow-band laser (L) 26', but this laser emits radiation of fundamental frequency $f_O$ at only one end. An optical isolator (OI) 32 is interposed between the laser 26' and a beam splitter (FK) 31. The beam splitter 31 divides the radiation emitted by the laser 26' into a first beam portion and a second beam portion of fundamental frequency $f_O$. Like in the embodiment of FIG. 1, each of the two beam portions is passed through a frequency shifter (FS$_2$) 27', (FS$_1$) 28', whose output provides a frequency shifted beam portion of frequency $f_2$, $f_1$. One of the beam portions, the portion of frequency $f_2$, is guided to the first fiber coupler 19', while the other beam portion, the portion of frequency $f_1$, is passed through an external modulator 29' to the second fiber coupler 20'. An input of the laser 26' is connected to the conductor 22' coming from the heterodyne or homodyne coherent detector 13'.

According to the present invention, the module 16, 16', or its laser 26, 26', is used in the transceiver 11, 11' in a multifunctional manner:

The beam portion of frequency $f_2$ from the second frequency shifter 27, 27' is fed via the coupler 19, 19' into the heterodyne or homodyne coherent detector 13, 13' in the direction of the signal carrier wave of frequency $f_s$. FIG. 3a shows possible coherent optical transmission channels of particular frequencies, e.g., the channel of frequency $f_s$, below which the frequency $f_2$ of the beam portion from the laser 26, 26' is located. The laser 26, 26' (and in particular, the beam portion of frequency $F_2$) thus functions as a local oscillator that would otherwise conventionally be implemented in the form of a separate component.

Secondly, through its other beam portion of frequency $f_1$, which is coupled into the fiber link 12, 12' in a direction opposite to that of the signal carrier wave $f_s$ coming from the remote transceiver, the laser 26, 26' serves to transmit signals from the receiving end. This other beam portion of frequency $f_1$ can be modulated with the message at the external modulator 29, 29' in a conventional manner.

Figure 3B:
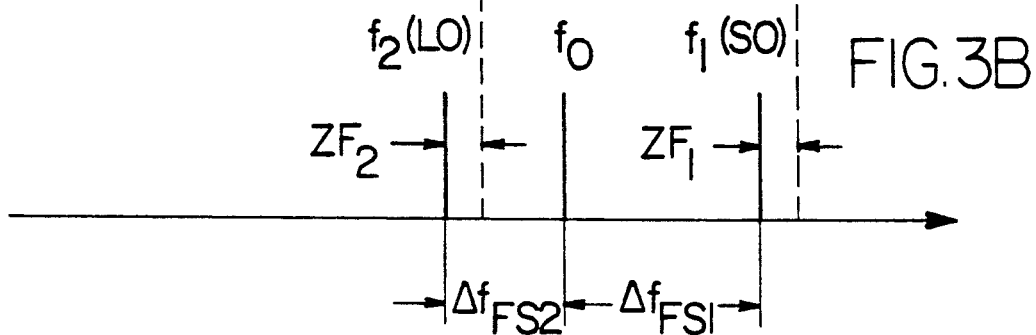

If the laser 26, 26' in the module 16, 16' is used both as a transmitter oscillator laser (SO) and a local oscillator laser (LO) as was just described, the frequency $f_2$ is lower than the frequency $f_s$ of one channel, and the frequency $f_1$ is lower than the frequency $f_i$ of the other channel, as shown in FIG. 3b. The fundamental frequency $f_O$ of the radiation emitted by the laser 26, 26' is located between the frequencies $f_1$ and $f_2$ of the two beam portions. In a heterodyne detection system, the frequency control via the feedback conductor 22, 22' of such a dual-purpose laser module 16, 16' is accomplished by intermediate-frequency control ZF or any other conventional method, with the frequency $f_2$ of the first beam portion being stabilized with respect to the frequency $f_S$ of the signal carrier wave (or with respect to a defined reference frequency $f_R$). Since the frequencies $f_1$ and $f_2$ of the phase-shifted beam portions were produced by electrical modulation of the frequency $f_O$ in the frequency shifters 28 and 27, respectively, or 28' and 27', respectively, which are implemented with electrooptical modulators, for example, with $$\Delta f_{FS2} = f_2 - f_{01}$$

$$\Delta f_{FS2} = f_1 - f_{01}$$

the frequency $f_2$ of one beam portion automatically determines the fundamental frequency $f_0$ of the laser and the frequency $f_1$ of the other beam portion. By the electrical derivation of the frequencies $f_1$ and $f_2$ from the fundamental frequency $f_0$, these frequencies $f_1$ and $f_2$ can be placed at the frequency $f_i$ of any optical channel of the coherent optical transmission system, provided that this frequency $f_i$ lies within the modulation bandwidth of the frequency shifters 28 and 27, respectively, or 28' and 27', respectively.

Thirdly, the laser 26, 26' in the module 16, 16' can be used via its beam portion of frequency $f_1$ to amplify the signal carrier wave of fundamental frequency $f_s$ in the fiber link 12, 12', which is implemented with a single mode fiber, by sending narrow-band pumping light of frequency $f_1$ and with a defined frequency offset from the fundamental frequency $f_s$ of $$\Delta f_B = f_1 - f_s$$

in a direction opposite to that of the signal carrier wave. $\Delta f_B$ is referred to as the Brillouin frequency shift and amounts, for example, to 11.2 GHz at 1.5μm light wavelength ($\Delta f_B$ is dependent on the light wavelength).

Figure 3C:
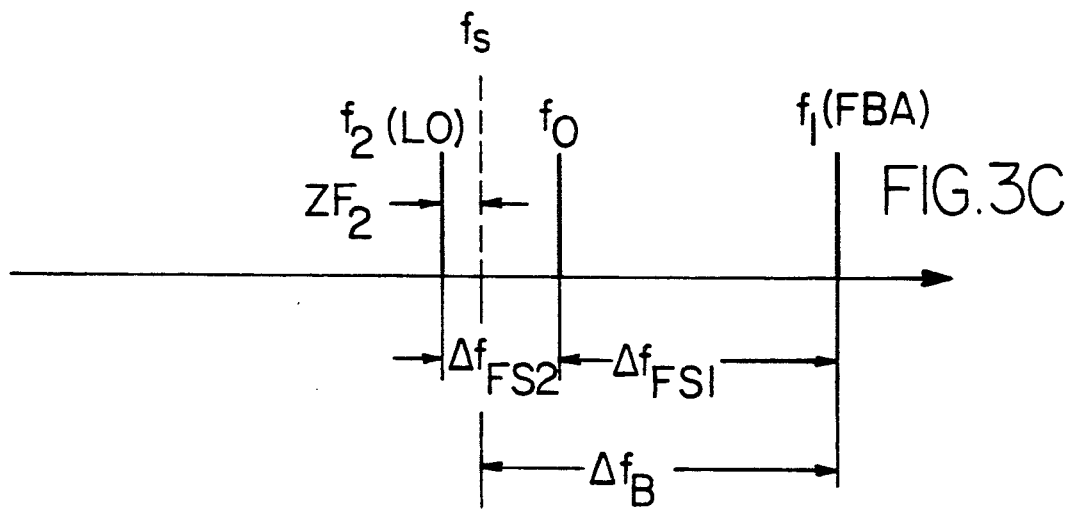

If the module 16, 16' is operated in a configuration in which it performs the first and last of the three functions mentioned above, i.e., in which it acts as a local-oscillator laser (LO) and, at the same time, as a fiber Brillouin amplifier (FBA), the frequency configuration shown in FIG. 3c is obtained. Via the intermediate frequency $$ZF_2 = f_2 - f_s$$

the signal on the signal carrier wave of frequency $f_s$ is demodulated. At the same time, the signal carrier wave of frequency $f_s$ is optically amplified via the pumping wave or the beam portion of frequency $f_1$ amplified by making use of backward-wave stimulated Brillouin scattering:

$$\Delta f_B = (f_1 - f_0) + (f_0 - f_2) - (f_s - f_2)$$

$$\Delta f_B = \Delta f_{FS1} + \Delta f_{FS2} - ZF_2,$$

where $\Delta f_B$ = Brillouin frequency shift (11.2 GHz at 1.5 μm wavelength)
$ZF_2$ = intermediate frequency during optical heterodyne detection
$\Delta f_{FS1,2}$ = frequency shift with respect to $f_0$.

Since $\Delta f_B$ is relatively large, it is necessary, because of the RF limitation of the frequency shifters, that $\Delta f_{FS1}$ and have unlike signs. Since the signal to be amplified has a longer wavelength (Stokes shift), the pumping wave of frequency $f_1$ must be placed on the side of higher frequencies with respect to the frequency $f_s$ of the signal carrier wave and of the fundamental emission frequency $f_O$ of the laser 26, 26'.

It is also possible to use the module 16, 16' simultaneously for all three of the above-mentioned purposes, i.e., as a transmitter-oscillator laser, a local oscillator laser, and a fiber Brillouin amplifier. This can be done, for example, by dividing the beam portion of frequency $f_1$ once again with the aid of a beam splitter. Preferably, however, the beam portion of frequency $f_1$ is used alternately to transmit a signal carrier wave of frequency $f_1$ or to optically amplify the signal carrier wave of frequency $f_s$ coming from the remote transceiver. In this manner, a three-function laser module 16, 16' is obtained.

At least some of the components of the transceiver 11, 11' may be present in hybrid form and be interconnected via optical waveguides (not shown). It is also possible to interconnect at least some of the components of the transceiver 11, 11', including the optical conductors, in monolithic integrated form on an electrooptical substrate.

I claim:

1. Transceiver for a bidirectional coherent optical fiber transmission system, the transceiver comprising:
   an optical waveguide as a transmission medium,
   a laser for emitting a signal carrier wave,
   a modulator for modulating the signal carrier wave outputted by the laser,
   a coherent optical heterodyne detector responsive to a received optical signal and a local oscillation signal for detecting a received signal carrier wave,
   a demodulator for demodulating the signal carrier wave detected by the detector,
   a first coupler for coupling a first beam portion of the laser into the detector in the direction of a signal wave received over the optical waveguide from a remote transceiver, and
   a second coupler for coupling a second beam portion of the laser into the optical waveguide in a direction opposite to that of the signal wave coming from the remote transceiver and away from said first coupler,
   wherein
   the first beam portion of the laser is the local oscillation signal used by the detector,
   the first coupler is physically separate from the second coupler,
   the first coupler is between the detector and the second coupler, and
   the location and orientation of the first coupler relative to the second coupler prevents the local oscillation signal from passing through the second coupler back to the laser.

2. A transceiver as claimed in claim 1, wherein the laser emits radiation in two exit directions.

3. A transceiver as claimed in claim 1, wherein the laser is a unidirectionally emitting laser whose beam is divided into at least two spatially separated beam portions.

4. A transceiver as claimed in claim 1, wherein at least one frequency-shifting component is positioned in the path of each said beam portion emitted by the laser.

5. A transceiver as claimed in claim 4, wherein said at least one said frequency-shifting component comprises an electrooptical modulator.

6. A transceiver as claimed in claim 1, wherein said modulator is external to said laser.

7. Transceiver for a bidirectional coherent optical fiber transmission system, the transceiver comprising:
- a laser for producing an optical output from which an optical signal carrier wave is derived,
- a modulator for modulating said optical signal carrier wave,
- a detector responsive to a received optical signal and a first local oscillation signal for detecting a received signal carrier wave, and
- an optical amplifier which uses a second local oscillation signal to amplify the received optical signal,
- wherein a common source of optical radiation emits both of said local oscillation signals.

8. A transceiver as claimed in claim 7 wherein
- said laser constitutes said common source of optical radiation,
- a first portion of the beam of the laser constitutes said second local oscillation signal and is coupled into a fiber link leading to the detector in the direction of the received optical signal, and
- a second portion of the beam of the laser constitutes said first local oscillation signal and is coupled into the fiber link in the opposite direction.

9. A transceiver as claimed in claim 7 wherein a first portion of the common source is directionally coupled into a fiber link leading to the detector, and a second portion of the common source is coupled into the fiber link in the opposite direction to amplify said received optical signal.

10. The transceiver of claim 7, wherein said transmit laser functions as said common source of optical radiation.

11. Transceiver for a bidirectional coherent optical fiber transmission system, the transceiver comprising:
- a transmit laser for producing an optical output having an associated fundamental frequency from which is derived an optical signal carrier wave,
- a modulator for modulating said optical signal carrier wave,
- a detector responsive to a received optical signal and a local oscillation signal for detecting a received signal carrier wave, and
- a demodulator for demodulating the received signal carrier wave detected by the detector, and
- an optical amplifier responsive to a second local oscillation signal and to the received signal carrier wave for optically amplifying said received optical signal, where
- the transmit laser also emits a local oscillation signal which is used by the detector,
- a first portion of the beam of the transmit laser is coupled into a fiber link leading to the detector in the direction of the received optical signal, and
- a second portion of the beam of the transmit laser is coupled into the fiber link in the opposite direction, said second portion comprising
  - an unmodulated portion which has a frequency higher than that of the received signal carrier wave and which functions as the second local oscillation signal and
  - a modulated portion which functions as the transmitted signal carrier.

12. A transceiver as claimed in claim 11, wherein said detector is a heterodyne detector which derives an intermediate-frequency control signal from said received optical signal and said local oscillation signal,
- the frequencies of Qach of said beam portions are respectively derived from said fundamental frequency by frequency shifting by a respective constant frequency deviation,
- said fundamental frequency is stabilized with respect to an incoming reference frequency associated with said received optical signal using said intermediate-frequency control signal.

13. A transceiver as claimed in claim 12, wherein
- the modulated portion of the second beam portion is used for optical amplification of the received signal carrier wave, and
- the first beam portion is used for optical heterodyne detection of the received signal carrier wave.

14. A transceiver as claimed in claim 12, wherein the second beam portion is alternately used to transmit said signal carrier and to optically amplify the received signal carrier wave.

15. Transceiver for a bidirectional coherent optical fiber transmission system, the transceiver comprising:
- a laser for producing an optical output having an associated fundamental frequency from which is derived an optical signal carrier wave,
- a modulator for modulating said optical signal carrier wave,
- a detector responsive to a received optical signal and a local oscillation signal for detecting a received signal carrier wave and for deriving an intermediate-frequency control signal, and
- a demodulator for demodulating the received signal carrier wave detected by the detector,
- wherein
- a first portion of the beam of the laser having an associated first frequency functions as a local oscillation signal and is coupled into a fiber link leading to the detector in the direction of the received optical signal, and
- a second portion of the beam of the laser having an associated second frequency different from said first frequency functions as said optical signal carrier wave and is coupled into the fiber link in the opposite direction,
- the frequencies of the two beam portions are respectively derived from said fundamental frequency by frequency shifting by a respective constant frequency deviation,
- said fundamental frequency is stablized with respect to an incoming reference frequency associated with said received optical signal using said intermediate-frequency control signal,
- the second beam portion is used to transmit optical signals at said second frequency, and
- the first beam portion is used by the detector as the local oscillation signal for optical heterodyne or homodyne detection of the received signal carrier wave;
- whereby the local oscillation signal and the transmitted optical signal are both frequency stablized with respect to the incoming reference frequency.

* * * * *